United States Patent [19]

Adrian et al.

[11] 4,147,758
[45] Apr. 3, 1979

[54] PRODUCTION OF ALUMINUM POLYPHOSPHATE

[75] Inventors: Renate Adrian; Raban von Schenck, both of Hurth; Bernd Cox, Elz; Peter Wirtz, Konigstein, all of Fed. Rep. of Germany

[73] Assignee: Hoechst Aktiengesellschaft, Frankfurt am Main, Fed. Rep. of Germany

[21] Appl. No.: 794,959

[22] Filed: May 9, 1977

[30] Foreign Application Priority Data

May 13, 1976 [DE] Fed. Rep. of Germany ....... 2621170

[51] Int. Cl.$^2$ .................. C01B 15/16; C01B 25/26
[52] U.S. Cl. ..................................... 423/315; 423/305
[58] Field of Search ........................ 423/305, 307–315

[56] References Cited

U.S. PATENT DOCUMENTS

| | | | |
|---|---|---|---|
| 1,654,404 | 12/1927 | Blumenberg | 423/305 |
| 3,394,987 | 7/1968 | Lee et al. | 423/311 |
| 3,650,683 | 3/1972 | Hloch et al. | 423/305 |
| 3,801,704 | 4/1974 | Kobayashi et al. | 423/311 X |
| 3,943,231 | 3/1976 | Wasel-Nielen et al. | 423/311 |

*Primary Examiner*—O. R. Vertiz
*Assistant Examiner*—Gregory A. Heller
*Attorney, Agent, or Firm*—Connolly and Hutz

[57] ABSTRACT

Aluminum polyphosphate is made. To this end, solid aluminum hydroxide and polyphosphoric acid which are used in proportions corresponding to an Al:P molar ratio of 1:2.5 to 1:3.5, are introduced separately from, but concurrently with, one another into a reaction zone kept at 150° to 200° C. A moist friable consistency of the starting materials is maintained in the reaction zone by continuously mixing, kneading and comminuting them over substantially the entire period during which they are introduced into the reaction zone. The reaction is continued until a dry sandy powder is formed; and the powder is annealed at 400° to 600° C. over a period sufficient to yield a product undergoing a 0.5 to 1% weight loss on ignition.

5 Claims, No Drawings

PRODUCTION OF ALUMINUM POLYPHOSPHATE

The present invention relates to a process for making aluminium polyphosphate by reacting aluminium hydroxide with phosphoric acid and subjecting the resulting reaction product to thermal treatment.

On the evidence of their specific X-ray diagrams, condensed aluminium phosphates are classified by the "American Society for Testing and Materials" (ASTM) as, inter alia, long-chain products (ASTM 13-266), cyclic aluminium tetrametaphosphate (ASTM 14-430) and berlinite (ASTM 10-423).

Aluminium polyphosphates are chiefly used as hardeners for water-glass cements.

U.S. Pat. No. 3,445,257 discloses a process for making condensed aluminium phosphates, wherein an acid aluminium orthophosphate is subjected to thermal treatment, this aluminium orthophosohate being prepared by introducing aluminium hydroxide into phosphoric acid and evaporating the resulting solution, this solution containing $P_2O_5$ and $Al_2O_3$ in a ratio of 1:1 to 3:1. In a first step, the aluminium orthophosphate is heated to constant weight at a maximum temperature of 400° C., and, in a second step, the aluminium orthophosphate is heated, again to constant weight, at a maximum temperature of 750° C. More specifically, $Al(OH)_3$ is suspended in water and the resulting suspension is stirred into preheated phosphoric acid (Al:P ratio = 1:2.5), in which the aluminium hydroxide is dissolved with evolution of heat. The solution is gradually evaporated until turbid, the remaining material is dried in a spray drier or drum drier, and the resulting intermediate product is annealed discontinuously in a shelf drier or continuously in a rotating tube over several hours at temperatures of 300° to 400° C. and 500° to 600° C.

All the condensed phosphates made by the process just described constitute mixtures of variable proportions of the three ASTM-classified phosphates mentioned above, namely of 65 to 75% of long-chain aluminium polyphosphate (ASTM 13-266), 10 to 20% of cyclic aluminium tetrametaphosphate (ASTM 13-430), and about 15% of berlinite of the formula $AlPO_4$ (ASTM 10-423). Inasmuch as only long-chain aluminium polyphosphate is considered to be useful as a hardener for water-glass cements (aluminium tetrametaphosphate and berlinite are unsuitable for use as hardeners), it is highly desirable to produce a product consisting substantially exclusively of aluminium polyphosphate with a view to its use as a hardener of considerably improved efficiency.

It is therefore an object of the present invenion to provide a simple process for making condensed aluminium phosphate consisting of at least 95% by weight of long-chain aluminium polyphosphate (ASTM 13-266).

This object can unexpectedly be achieved by means of the present invention, which provides a process for making aluminium polyphosphate by reacting aluminium hydroxide with phosphoric acid and subjecting the resulting reaction product to thermal treatment, which comprises: introducing into a reaction zone kept at a temperature of 150° to 200° C. a mixture of starting materials consisting of solid aluminium hydroxide and polyphosphoric acid containing 75 to 85 weight % of $P_2O_5$, the proportions of these starting materials corresponding to an Al:P molar ratio of 1:2.5 to 1:3.5, and the starting materials being introduced into the reaction zone separately from, but concurrently with, one another; maintaining a moist friable consistency of the starting materials by continuously mixing, kneading and comminuting them over substantially the entire period during which they are introduced into the reaction zone; continuing the reaction until a dry sandy powder is formed; and annealing the powder at 400° to 600° C. over a period sufficient to yield a product undergoing a 0.5 to 1% weight loss on ignition. The reaction is preferably effected at approximately 170° C., and the polyphosphoric acid used preferably contains substantially 84 weight % of $P_2O_5$; the Al:P molar ratio is preferably substantially 1:3. The annealing treatment is preferably effected at a temperature of approximately 500° C.

The dry sandy intermediate product obtained in the reaction zone, which is preferably a heated kneader or mixer, consists of partially condensed aluminium phosphate; its degree of condensation is higher than that of the polyphosphoric acid, and this suggests that the reaction involves more than a mere neutralization.

By the use of sufficiently powerful mixing devices, it is possible to obtain the intermediate product quite rapidly, i.e. in a much shorter time than has been considered necessary heretofore, in procedures involving the cautious evaporation of aluminium phosphate solutions.

Of particular interest is the ease with which the intermediate product can be converted directly, by thermal treatment involving a single annealing step, into a desirable high-grade aluminium polyphosphate. In marked contrast with this, it has been considered necessary heretofore to effect the condensation according to a strict temperature/time-programme over a period of several hours in an attempt to avoid predominantly the formation of significant proportions of aluminium tetrametaphosphate.

The intermediate product is easy to anneal in a rotating tube, muffle furnace or shelf furnace. The annealing treatment in accordance with this invention also compares favourably with the prior temperature and time-controlled annealing treatment, inasmuch as it can be achieved more easily and within shorter periods of time, whereby the throughput rate is considerably improved.

In clear contrast with the products which are obtained by prior processes, the condensed aluminium polyphosphate obtained by the process of the present invention no longer comprises a mixture of various components; it consists almost exclusively of long chain aluminium polyphosphate. X-ray spectroscopy has failed to indicate the presence of $AlPO_4$ berlinite. The content of (cyclic) aluminium tetrametaphosphate is normally less than 5 weight %.

The following Examples illustrate the invention.

EXAMPLE 1

1.54 kg of dry aluminium hydroxide and 5 kg of polyphosphoric acid (containing 84 weight % of $P_2O_5$) were introduced separately from, but concurrently with, one another into a laboratory kneader heated to 200° C., at a rate permitting them to remain in a moist and friable state until their introduction was complete. After a short while, the moist mass was found to have been converted, in the kneader, to a dry sandy powder; it remained for this to be condensed.

Annealing at 500° C. resulted, within 1 hour, in the formation of a long-chain aluminium polyphosphate which underwent a 0.5 to 1% weight loss on ignition, the exact weight loss depending on the chain length of the polyphosphate. The X-ray diagram of this product showed the lines typical of aluminium polyphosphate (ASTM 13-266), but contained no indication of the presence of $AlPO_4$ berlinite. As for aluminium tetrametaphosphate (ASTM 13-430), it was just possible to see evidence for its presence.

EXAMPLE 2

30.75 kg of aluminium hydroxide and 100 kg of polyphosphoric acid (containing 84 weight % of $P_2O_5$) were introduced concurrently, via a vibrating channel and a metering pump respectively, into a kneader heated to 200° C. The reaction occurred at once during the introduction phase, which took 30 minutes, and resulted in the formation of a moist friable mass, which was found after a further 30 minutes to have been converted into a sandy powder. The powder so obtained was annealed at 500° C., and gave the same high-grade aluminium polyphosphate as in Example 1 (ASTM 13-266).

We claim:

1. A process of producing long chain aluminium polyphosphates as defined in ASTM 13-266, which comprises step (A) of introducing into a reaction zone as starting materials aluminum hydroxide and polyphosphoric acid containing 75 to 85 weight % of $P_2O_5$ in amounts corresponding to a molar ratio of Al:P of 1:2.5 to 1:3.5; continuously mixing, kneading and comminuting the starting materials in the reaction zone and heating the resulting mixture at a temperature of 150° to 200° C. for as long as necessary to ensure conversion to a dry, sandy, pulverulent intermediate product; and step (B) of dehydrating said intermediate product by annealing it at temperatures within the range 400° to 600° C. for a period sufficient to yield a final product undergoing 0.5 to 1% weight loss on ignition.

2. The process as claimed in claim 1, wherein the proportions of the aluminum hydroxide and polyphosphoric acid corresponding to an Al:P molar ratio of substantially 1:3.

3. The process as claimed in claim 1, wherein the polyphosphoric acid used contains substantially 84 weight% of $P_2O_5$.

4. The process as claimed in claim 1, wherein the reaction is effected at a temperature of approximately 170° C.

5. The process as claimed in claim 1, wherein the annealing treatment is effected at a temperature of approximately 500° C.

* * * * *